United States Patent [19]
Mouliney et al.

[11] Patent Number: 5,745,835
[45] Date of Patent: Apr. 28, 1998

[54] PROCESS AND APPARATUS FOR DISSOLVING A MIXTURE OF OXIDES OF URANIUM AND OF PLUTONIUM

[75] Inventors: Marie-Hélène Mouliney, Voiron; Claude Bernard, Saint Remy Les Chevreuse, both of France

[73] Assignee: Compagnie Generale Des Matieres Nucleaires, Velizy-Villacoublay, France

[21] Appl. No.: 711,951

[22] Filed: Sep. 6, 1996

[30] Foreign Application Priority Data

Sep. 6, 1995 [FR] France .................. 95 10428

[51] Int. Cl.$^6$ ........................................ B01F 1/00
[52] U.S. Cl. .................. 423/20; 422/159; 422/184.1; 422/225; 422/227; 422/255; 205/44; 205/46
[58] Field of Search ................ 423/20; 422/159, 422/184.1, 225, 227, 255; 205/44, 46

[56] References Cited

U.S. PATENT DOCUMENTS

| | | |
|---|---|---|
| 3,813,464 | 5/1974 | Ayers . |
| 4,333,912 | 6/1982 | Mills et al. .................. 423/20 |
| 4,341,738 | 7/1982 | Kemmler et al. .............. 422/184 |
| 4,439,279 | 3/1984 | Herrmann et al. ............. 205/44 |
| 4,686,019 | 8/1987 | Ryan et al. .................. 204/1.5 |
| 4,749,519 | 6/1988 | Koehly et al. ................ 423/3 |
| 5,190,623 | 3/1993 | Sasaki et al. ................ 204/1.5 |

FOREIGN PATENT DOCUMENTS

| | | |
|---|---|---|
| 0089185 | 9/1983 | European Pat. Off. . |
| 0160589 | 11/1985 | European Pat. Off. . |
| 8910981 | 11/1989 | WIPO . |

OTHER PUBLICATIONS

Electrogenerated Ag II for Recovery of $PuO_2$ From Waste, ENC '94, Mouliney et al, Oct. 2–6, 1994, Lyon, France.

*Primary Examiner*—Ngoclan Mai
*Attorney, Agent, or Firm*—Dennison, Meserole, Pollack & Scheiner

[57] ABSTRACT

A process and apparatus for dissolving a mixed oxide or mixture of oxides of uranium and plutonium. The powder is added with nitric acid to a chamber to dissolve uranium oxide, and the solution is circulated through a circuit of the apparatus with a portion of the solution passing through a filter. At least a portion of the filtered solution containing dissolved uranium oxide is removed from the apparatus, while returning non-filtered circulating solution containing non-dissolved plutonium oxide to the chamber. The removal of solution is then terminated, a monovalent silver salt is added and divalent silver is generated in-situ by electrolysis, the divalent silver causing dissolution of the plutonium oxide.

14 Claims, 1 Drawing Sheet

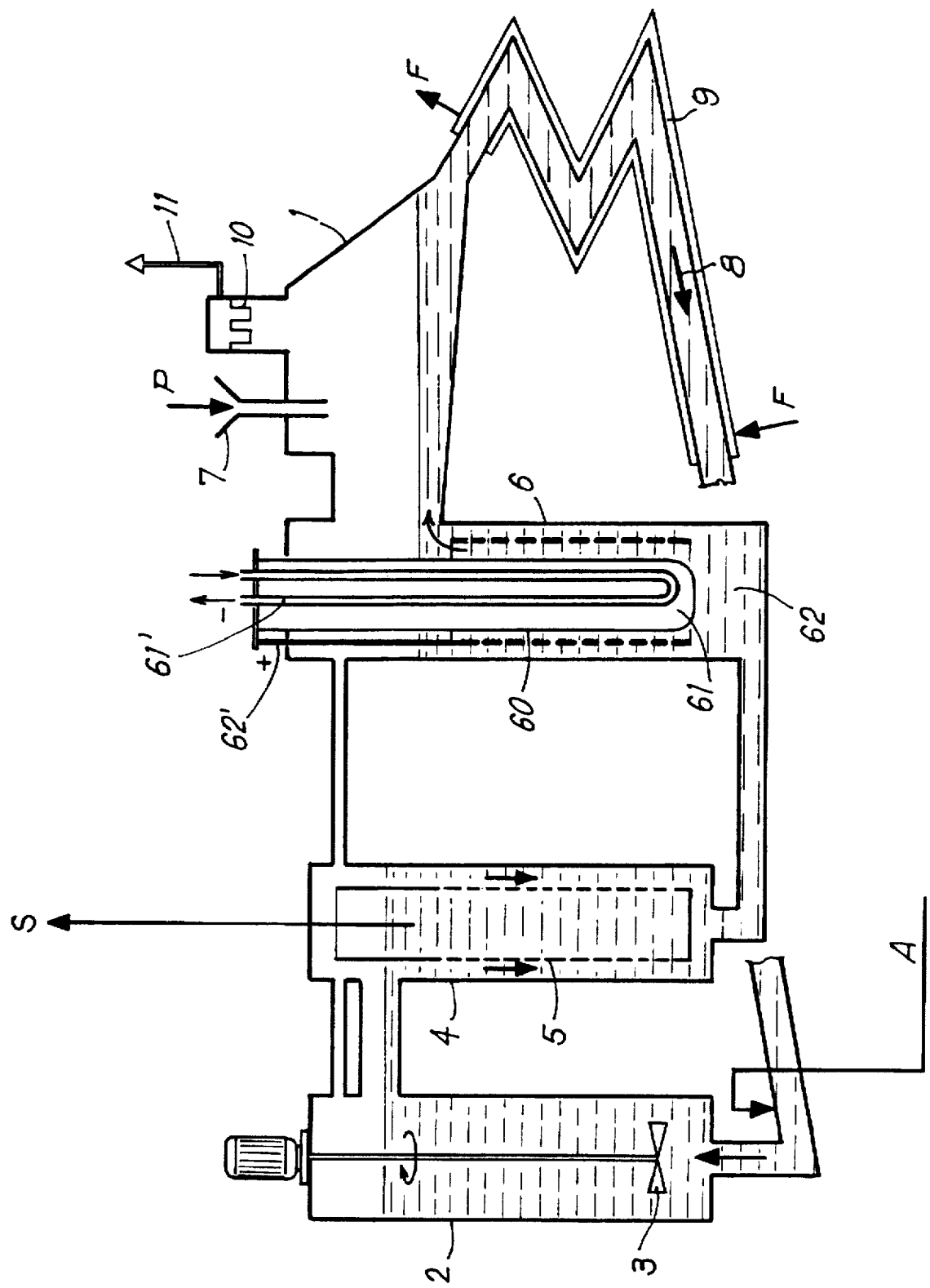

PROCESS AND APPARATUS FOR DISSOLVING A MIXTURE OF OXIDES OF URANIUM AND OF PLUTONIUM

The present invention concerns a process and an apparatus for dissolving a mixture of oxides of uranium and of plutonium; more precisely, a process and an apparatus for dissolving a powder consisting essentially of a mixture of uranium oxide $UO_2$, plutonium oxide $PuO_2$ and/or mixed oxides $(U, Pu)O_2$.

The term "powder" as used in the present text and accompanying claims denotes both a powder in its dry state and a powder suspended in a liquid.

BACKGROUND OF THE INVENTION

The Assignees have encountered the problem of carrying out this type of "double" dissolution more particularly at the La Hague site.

Uranium oxide ($UO_2$) is known to dissolve relatively easily in a solution of nitric acid ($HNO_3$); further, the dissolution of plutonium oxide ($PuO_2$) is known to require other procedures (or means).

Among such other procedures, electrolytic dissolution using divalent silver in solution as an oxidation intermediate has proved highly effective. Electrolytic dissolution will now be described briefly. The oxide to be dissolved ($PuO_2$) is introduced into a nitric solution ($HNO_3$: normality advantageously maintained in the range 4N to 6N) containing monovalent silver nitrate. This solution passes through the anode compartment of an electrolyzer. During electrolysis, $Ag^{II}$ is generated close to the anode. The $Ag^{II}$ generated oxidizes the plutonium of the $PuO_2$ which then dissolves in the nitric acid. Reduction reactions occur close to the cathode (in particular, reduction of $NO_3^-$). The resulting nitric acid consumption must be compensated by continuous addition of nitric acid to the cathode compartment (in that compartment, the normality is maintained at 8N or more to avoid hydrogen being given off).

That type of electrolytic dissolution or oxidizing dissolution of plutonium oxide ($PuO_2$) was studied in the 1980s, particularly by the Commissariat à l'Energie Atomique (i.e. the French Atomic Energy Commission). Said organization recommended its use for the recovery of plutonium contained in solid waste. Such a recovery process is described in French patent application FR-A-2 562 314.

Having studied the technical problems connected with carrying out "double" dissolution: $UO_2$—$PuO_2$, the Assignees designed a unit for single-step dissolution of mixtures of powder based on uranium oxide, plutonium oxide and/or mixed uranium/plutonium oxides. Such a unit operates discontinuously; the dissolution conditions are fixed by requirements of the least soluble constituent, namely plutonium oxide.

That unit, known as the URP unit, was disclosed in Lyon (France) at the ENC'94 (European Nuclear Conference: 2–6 October 1994), see the paper by M-H Mouliney, F-J Poncelet, P Miquel, V Decobert, and M Leconte entitled "Electrogenerated $Ag^{II}$ for recovery of $PuO_2$ from Waste".

That unit primarily consists of a dissolver comprising four interconnected compartments (obviously, the compartments have sub-critical geometry compatible with high plutonium concentrations):

- a chamber for receiving powder, connected to an apparatus for supplying the powder;
- a circulation compartment provided with a rotary stirrer. The stirrer causes the solution to circulate in the dissolver. It generates sufficient turbulence to disperse the powder which is introduced and to control the diffusion layer along the anode surface in the electrolyzer;
- an additional compartment to adjust the volume of the apparatus;
- an electrolysis cell (or electrolyzer) in which the $Ag^{II}$ ions required to dissolve the plutonium are generated. The cell includes a cylindrical platinum screen (anode) and a cathode chamber separated by a porous diaphragm.

As described above, such a dissolver operates discontinuously. It is filled with a nitric acid solution containing monovalent silver nitrate. The quantity of $Ag^{II}$ ions required to dissolve the plutonium is generated from the silver nitrate by electrolysis. The charge of powder to be dissolved is introduced into the circulating solution. The overall circulation of the solution is from the chamber for receiving powder to the circulation compartment, from the circulation compartment to the electrolysis cell, and from the electrolysis cell both to the chamber for receiving powder and to the additional compartment; the additional compartment communicates with the bottom of the circulation compartment. Means for cooling the circulating solution are provided. When dissolution is complete, the solution containing dissolved uranium and plutonium is extracted.

In such a dissolver, the desired result—"double" dissolution of uranium and of plutonium—is obtained without any particular difficulties, but with a high consumption of silver (Ag) relative to the quantity of plutonium dissolved. Further, the treatment capacity of such a dissolver is relatively limited.

High silver consumption is inherent to the physical phenomena occurring. The quantity of silver consumed during the process is not directly linked to the quantity of plutonium to be dissolved; it is proportional to the volume of solution to be treated, or electrolyzed. That volume primarily depends on the quantity of uranium to be dissolved, considering the maximum admissible concentration. Under such conditions, the quantity of silver to be introduced broadly depends on the quantity of uranium to be dissolved, while paradoxically, silver is not indispensable to the dissolution of uranium. High silver consumption is punitive as regards the operating costs of the dissolver, regardless of whether an additional step is employed for recovering the silver for recycling, or whether the silver is considered to be a consumable reactant. Electricity consumption is also high.

SUMMARY OF THE INVENTION

The Assignees have therefore reconsidered the problem and developed the present invention.

In both of its aspects, process and apparatus, the present invention constitutes an improvement over the prior art summarized above.

The process of the invention is an improvement over the process summarized above: it is an improvement as regards both the quantity of silver required to dissolve the plutonium and the treatment capacity of the apparatus. Operating costs are minimized in that the consumption both of silver and of electricity are reduced.

Further, the process of the invention provides for the recovery both of a solution in which mainly uranium oxide is dissolved, and of a solution in which dissolved plutonium oxide is practically the only solute. This uranium/plutonium separation can be of great importance in some contexts.

The process of the invention can be carried out in a dissolver of the type described above (for carrying out a single-step discontinuous dissolution process). The dissolver must, however, include additional filtering means. This is described below.

The process of the invention will now be described. It seeks to dissolve a powder consisting essentially of a mixture of oxides of uranium and of plutonium and/or mixed oxides (U, Pu)$O_2$. Dissolution occurs in a nitric acid solution with the aid of divalent silver produced in situ by electrolysis. In this respect, it is a process of the type which is summarized above.

The characterizing feature of the process of the invention is that it comprises two steps which are carried out successively in one and the same apparatus, inside which an attack solution circulates in a circuit. The two steps are described below.

The first step consists of dissolving the oxides which are soluble in nitric acid, i.e., mainly uranium oxide, in a nitric acid medium alone, i.e., with no silver II. During the first step, the apparatus is continuously supplied both with the powder to be dissolved and with nitric acid, while the circulating solution is continuously extracted at a set rate through a filter which forms an integral part of the apparatus. The rate is calculated so as to maintain a constant concentration in the solution. (The solution contains dissolved oxide).

The skilled person will be aware that prior to this first step, an equilibrium must be established. In this way, uranium dissolution is optimized. For the purposes of optimization, the free acid in the circulating solution is maintained at a constant level.

In any case, during the first step, all the uranium oxide is advantageously dissolved (plus any mixed oxide (U, Pu)$O_2$ soluble in a nitric acid medium). A stream of the circulating solution containing the dissolved oxides is extracted through a filter. The filter prevents the passage (entrainment) of non dissolved particles, in particular particles of plutonium oxide. If necessary, the filter can be cleaned using any suitable means. The extracted solution can be transferred to a downstream unit.

During the second step (the plutonium oxide dissolution step), the insoluble residue primarily constituted by the plutonium oxide accumulated during the first step is dissolved in the nitric acid using divalent silver obtained in situ by electrolysis (after introducing a charge of monovalent silver at the start of the second step). Electrolysis is only begun at the end of the first step, after the supply of powder and of acid has been stopped and extraction has been halted. Further, it is only carried out after a sufficient quantity of a reactant capable of generating divalent silver has been introduced into the charge to be electrolyzed. During this second step of the process of the invention, conventional electrolytic or oxidizing dissolution is carried out. Following this, when the plutonium oxide has been dissolved, the solution is transferred to a downstream unit by completely emptying the apparatus.

In general, it can be seen that the implementation of each step will not cause the skilled person any particular difficulty.

The originality of the process of the invention resides in carrying out these steps (one continuously, the other discontinuously) successively in the same apparatus incorporating a filter.

Advantageous features of the process of the invention will be described below.

During the first step (dissolving uranium oxide with continuous supply and extraction):

the solution to be filtered (circulating solution) sweeps the filter tangentially. This is of particular advantage as filter clogging is thereby limited;

the acidity of the circulating solution is maintained constant, advantageously close to 6N. This optimizes dissolution of the uranium oxide, as described above; and the circulating solution is heated, advantageously to maintain its temperature at about 80° C. This also optimizes dissolution of the uranium oxide, whatever the dissolution rate (attack kinetics).

At the end of the first step and at the beginning of the second step:

a sufficient quantity of monovalent silver in the form of silver nitrate is added to the circulating solution. The use of monovalent silver in a different form is not excluded from the scope of the invention.

During the second step (discontinuous dissolution of plutonium oxide):

the acidity of the circulating solution (in this step, in a closed circuit) is maintained in the range 4N to 6N. This favors the desired result (oxidizing dissolution of $PuO_2$). In any case, during electrolysis, the acidity of the circulating solution tends to fall. In general, the apparatus and conditions of use are set so that the acidity is kept in the range 4N to 6N without adding acid;

the circulating solution is cooled, advantageously to maintain its temperature at about ambient temperature (25° C.). Cooling is advisable as the electrolysis is exothermic.

As indicated above, the process of the invention can be carried out in a dissolver of the type described during ENC'94, with an added filtration system in order to be able to extract solution continuously during the first step of the operation.

More precisely, a dissolver for carrying out the process of the invention, which constitutes the second aspect of the invention, comprises the following interconnected elements:

a circulation compartment provided with a stirrer to agitate and circulate solution in the dissolver assembly;

an additional compartment; and an electrolysis cell for the production of divalent silver; wherein:

means are provided for continuously filtering a stream of said circulating solution; said means being associated with other means for extracting said stream.

The filtering means are advantageously arranged in the additional compartment. As will already be understood from the above description, they are used only during the first step of the process.

Because of the nature of the circulating substances (more precisely the presence of significant quantities of plutonium), all the elements of the dissolver—circulation compartment, additional compartment, electrolysis cell—have subcritical geometry.

In a preferred variation, the dissolver also includes a chamber for receiving powder to be dissolved. This also has subcritical geometry. It is advantageously connected to the circulation compartment and to the electrolysis cell. As indicated above, such a chamber for receiving powder is supplied with the dry powder or with the powder suspended in a liquid. Such a suspension is prepared outside the dissolver.

The presence of such a chamber is not essential. It is possible to supply the powder (as a powder proper or as a suspension of powder) to any one of the three basic elements of the dissolver—the circulation compartment, the additional compartment, or the electrolysis cell—or to a conduit interconnecting any two of these three elements.

The dissolver of the invention, with or without a chamber for receiving powder, is advantageously equipped with means for heating or cooling the circulating nitric acid solution. Such means advantageously consist of a double-walled jacket which can be supplied with heating or cooling fluid, arranged around a conduit of the dissolver.

Advantageously, when the dissolver includes a chamber for receiving powder, a double-walled jacket is arranged around the conduit connecting the chamber to the circulation compartment.

In any case, the structure of the dissolver of the invention may include the four compartments of the dissolver of the prior art. A novel feature of the preferred variation of the invention is that the additional compartment is provided with means for continuously filtering and extracting a stream of circulating solution. A further novel and particularly advantageous feature is that the four compartments are arranged so that the solution flows from the top of the circulation compartment towards the top of the additional compartment, then from the bottom of the additional compartment towards the bottom of the anode compartment of the electrolyzer, which overflows (in its upper portion) into the chamber for receiving powder. From that chamber, the solution returns through a heat exchanger (to remove or add heat) towards the intake of the rotary stirrer located in the circulation compartment.

In this advantageous variation, the solution thus circulates from top to bottom in the additional compartment. Filtration is thus advantageously effected by tangential sweeping of a filter which is located vertically, extending over at least a portion of the height of the compartment.

BRIEF DESCRIPTION OF THE DRAWING

The process and apparatus of the invention will now be described with reference to the accompanying single FIGURE, which is a schematic diagram of an apparatus according to the invention.

DESCRIPTION OF THE PREFERRED EMBODIMENTS

The figure represents a dissolver of the invention (in its preferred form) comprising:

- a chamber 1 for receiving powder;
- a circulation compartment 2 provided with a rotary stirrer 3 to agitate and circulate nitric acid solution in the dissolver assembly at an adjustable rate (the rate can be regulated by adjusting the rotation speed of stirrer 3);
- an additional compartment 4 for filtration and extraction, provided with a filter 5 through which a stream of solution S is extracted during the first step of the process, non dissolved particles being retained on the filter and/or held in suspension in the circulating dissolution solution;
- an electrolysis cell 6 for generating $Ag^{II}$ ions for dissolving plutonium oxide during the second step of the process. Electrolysis cell 6 is constituted by a cathode chamber 61 (including cathode 61') and an anode compartment 62 (including anode 62') separated by a semi-permeable wall 60 which allows electricity to pass (essentially by migration of $H^+$ ions) while retaining the metal ions in the anode compartment and reduced nitrogen compounds in the cathode chamber.

In order to compensate for the nitric acid consumption in cathode chamber 61 during electrolysis, the chamber is connected to a buffer tank of concentrated nitric acid (tank not shown) from which addition can be effected.

The FIGURE does not show the discharge points which are advantageously at low positions, from which the dissolver can be emptied (in particular at the end of the second step).

Heat exchange (heating during nitric dissolution, cooling during electrolytic dissolution) is ensured by:

- the double-walled jacket 9 of conduit 8 (supplied with heating fluid during nitric dissolution and cooling fluid during electrolytic dissolution)
- recirculation to cathode chamber 61 from the concentrated nitric acid buffer tank (itself equipped with a cooler). This circulation is shown as two arrows.

The two successive steps of the process of the invention will be described below with reference to the figure.

During the first step (continuous dissolution of uranium oxide):

The dissolver is first filled with an approximately 9 N nitric acid solution and then the stirrer is activated to circulate the solution between the different elements of the dissolver.

Powder P ($P \sim UO_2 + PuO_2 +$ any $(U, Pu)O_2$) is then continuously introduced in known quantities via a funnel 7 opening into the chamber for receiving powder 1. The powder falls into the solution and the mixture is sucked into conduit 8 towards the lower part of compartment 2 under the effect of stirrer 3. The rate of extraction from compartment 4 is controlled to keep the uranium concentration in the solution constant. Nitric acid A is continuously introduced to the inlet to circulation compartment 2 to compensate for extraction (maintain a constant volume of solution in the dissolver) and to maintain a given free acidity in the solution.

During this continuous dissolution step, double-walled jacket 9 of conduit 8 is supplied with heating fluid to encourage dissolution.

The solution flows from compartment 2 to the top of filtering compartment 4 then from the bottom of this compartment to the bottom of anode compartment 62 of electrolyzer 6 (not switched on) which overflows into the chamber for receiving powder 1.

Extraction is continuous from compartment 4 through a filter 5 which retains non dissolved particles (mainly $PuO_2$). This extraction is shown schematically in the figure by the letter S.

The movement of the solution in compartment 4 limits clogging on the surface of filter 5. Cleaning can be effected using any suitable means.

During the second step (discontinuous dissolution of plutonium oxide):

Firstly, the supply of powder P and acid A is stopped.

A charge of $AgNO_3$ is introduced into circulation compartment 2 and electrolyzer 6 is activated.

The dissolution solution circulates as in the first step.

$Ag^{II}$ ions are continuously generated in anode compartment 62 of electrolyzer 6. They then circulate in the apparatus where the plutonium of the $PuO_2$ is oxidized to dissolve it rapidly in the nitric acid.

During this oxidizing dissolution step for the $PuO_2$, the double-walled jacket 9 of conduit 8 is supplied with cooling fluid to remove the heat evolved during electrolysis.

During this step, the acidity of the dissolution solution gradually reduces. The apparatus and the operating conditions are set so that the acidity of the dissolution solution is maintained in the range 4 N to 6 N during the entire second step.

Similarly, the acidity of the solution contained in cathode chamber 61 gradually reduces. In order to keep this acidity above 8N, concentrated nitric acid from the buffer tank described above (and not shown) is introduced into cathode chamber 61.

Circulation of acid in cathode chamber 61 encourages the removal of heat evolved during electrolysis by means of a cooling heat exchanger installed in the circulation tank.

The atmosphere of the apparatus is connected to a gas treatment and ventilation unit by a vent connected to the top of the chamber for receiving powder 1.

The extracted gases 11 are filtered upstream of the vent by filter 10 to trap any entrained powder.

Finally, the invention will be illustrated by the following example.

The dissolution process was used to dissolve a powder P containing, as a mixture:

93% by weight $UO_2$;

6% by weight $(U, Pu)O_2$ (mixed oxide soluble in a nitric medium);

1% by weight of insoluble $PuO_2$.

$(P=UO_2+(U, Pu)O_2+PuO_2)$.

Powder P was introduced at a rate of 2.5 kg of metal/hour (metal: U, Pu) into a dissolver with a working volume of 65 liters: the dissolver was as shown in FIG. 1.

A solution of 9N nitric acid was already circulating in the dissolver at a temperature of 80° C.

After about 7 hours of operation, equilibrium was reached ($HNO_3$~6N; concentration of metal in the circulating solution: 250 g/l). The $UO_2$ and $(U, Pu)O_2$ had dissolved in the solution.

The acidity was kept constant by addition A of 9N acid at a rate of 10 l/h. Extraction S from compartment 4 was carried out at the same average rate.

After about 130 hours, 3.25 kg of insoluble Pu had accumulated in the dissolver.

The heating, powder supply P, 9 N acid supply, and extraction S were all stopped.

The second step of the dissolution process was then carried out under the following conditions:

cooling was begun;

silver nitrate was introduced into the circulation compartment 2 to obtain a silver concentration of 0.05 mol/l in the solution;

electrolyzer 6 was activated;

cathode chamber 61 initially filled with 13.6N acid was supplied via a circuit (at 400 l/h) from a 50 liter tank (initially filled with 13.6N acid) to maintain the nitric acid acidity in cathode chamber 61 above 8N and to remove the heat evolved during electrolysis.

Complete dissolution was achieved after about 5 hours. Electrolytic dissolution (of the same quantity of Pu) carried out using the prior art process (treating the charge in a single step) would have consumed about 20 times as much silver.

Further, the process of the invention had a treatment capacity which was about 1.5 times greater than that of the prior art process.

We claim:

1. A process for dissolving a powder selected from the group consisting of a mixture of uranium and plutonium oxides, mixed oxides of uranium and plutonium and mixtures thereof, comprising the steps of:

continuously adding said powder and nitric acid to a chamber of a dissolving apparatus to obtain a solution comprising uranium oxide;

circulating the solution from the chamber through a circuit of said dissolving apparatus and passing a portion of the solution through a filter in the circuit;

removing at least a portion of the filtered solution containing dissolved uranium from the apparatus, while returning non-filtered, circulating solution containing non-dissolved plutonium oxide in suspension to the chamber, the rate of said removing being adjusted to maintain a constant concentration of uranium oxide in the circulating solution;

terminating said removing and said continuous adding, and adding a monovalent silver salt to the circulating solution;

generating divalent silver in situ in the circuit by electrolysis of the monovalent silver salt, divalent silver causing dissolution of the non-dissolved plutonium oxide in the circulating solution; and removing a solution containing dissolved plutonium oxide from the apparatus.

2. A process according to claim 1, wherein the solution sweeps the filter tangentially.

3. A process according to claim 1, wherein the monovalent silver salt is silver nitrate.

4. A process according to claim 1, wherein the circulating solution undergoing electrolysis is maintained in an acid concentration range of 4N to 6N.

5. A process according to claim 1, wherein the circulating solution to which the nitric acid and powder are added is maintained at a constant acidity.

6. A process according to claim 1, wherein the circulating solution to which said nitric acid and powder are added is heated.

7. A process according to claim 1, wherein the circulating solution undergoing electrolysis is cooled.

8. A process according to claim 5, wherein the circulating solution to which the nitric acid and powder are added has an acidity of about 6N.

9. A process according to claim 6, wherein the circulating solution to which the nitric acid and powder are added is maintained at a temperature of about 80° C.

10. A process according to claim 7, wherein the circulating solution undergoing electrolysis is maintained at a temperature of about 25° C.

11. An apparatus for dissolving a powder selected from the group consisting of a mixture of uranium and plutonium oxides, mixed oxides of uranium and plutonium and mixtures thereof, comprising:

a chamber provided with a stirrer to agitate and circulate solution in the apparatus;

a second chamber containing means for continuously filtering a portion of a stream of circulating solution and means for removing a stream of filtered solution from the apparatus;

an electrolysis cell comprising an anode compartment and a cathode chamber for the production of divalent silver; and conduit means interconnecting said chamber, said second chamber and said electrolysis cell, forming a circulation loop for the solution.

12. An apparatus according to claim 11, further comprising a third chamber for receiving powder, inserted in the circulation loop for the solution.

13. An apparatus according to claim 12, wherein the third chamber is connected to the first chamber by a conduit comprising a double-walled jacket adapted for supply of a heating or cooling fluid.

14. An apparatus according to claim 12, wherein said first, second and third chambers and said electrolysis cell are interconnected such that the solution flows from a top portion of the first chamber to a top portion of the second chamber, and from the bottom portion of said second chamber to a bottom portion of the electrolysis cell constituting an anode compartment, the electrolysis cell arranged so as to overflow into the third chamber, said second chamber comprising a filter extending over at least a portion of its height.

* * * * *